No. 769,040. PATENTED AUG. 30, 1904.
W. ALEXANDER.
LUBRICATOR.
APPLICATION FILED APR. 6, 1904.
NO MODEL.
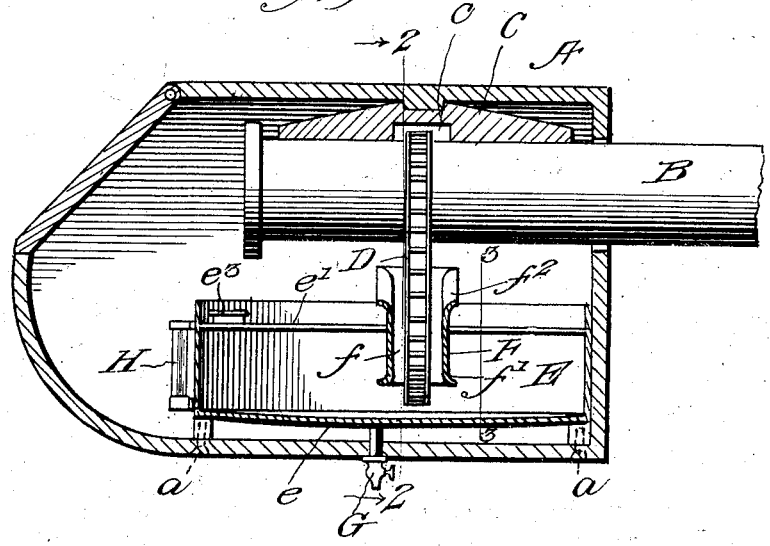
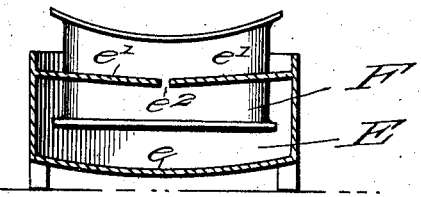
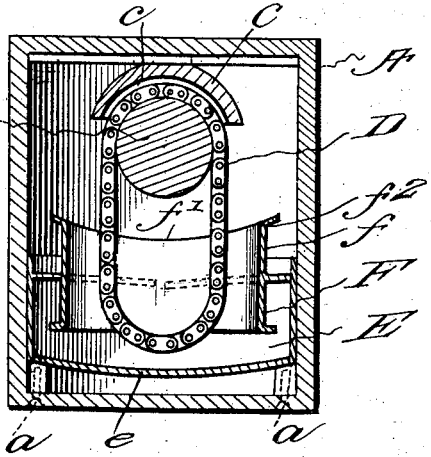
Witnesses
Inventor
William Alexander,
By Victor J. Evans
Attorney No. 769,040. Patented August 30, 1904.

UNITED STATES PATENT OFFICE.

WILLIAM ALEXANDER, OF MOUNTPLEASANT, TENNESSEE.

LUBRICATOR.

SPECIFICATION forming part of Letters Patent No. 769,040, dated August 30, 1904.

Application filed April 6, 1904. Serial No. 201,888. (No model.)

*To all whom it may concern:*

Be it known that I, WILLIAM ALEXANDER, a citizen of the United States, residing at Mountpleasant, in the county of Maury and State of Tennessee, have invented new and useful Improvements in Lubricators, of which the following is a specification.

This invention relates to a car-axle box, more particularly to the means for automatically lubricating the car-axle running therein, an object which I accomplish by securing within the axle-box a reservoir of oil, into which an endless chain hung on the car-axle extends and from which it continually raises the lubricant and deposits it on the revolving axle as the car to which it is attached is moved.

In the accompanying drawings, Figure 1 represents a vertical longitudinal section through a car-axle box, showing my invention applied thereto. Figs. 2 and 3 are views in cross-section on the lines 2 2 and 3 3 of Fig. 1.

The axle-box as a whole is indicated by A, into which projects the end of the axle B, bearing on the brass C, placed, as usual, between the axle and the top of the axle-box. The under surface of the brass C is grooved, as shown at C, to permit an endless chain D, which partly encircles the axle B and hangs downwardly therefrom to travel freely with the axle as it is rotated, but hold it against lateral movement.

Within the axle-box A is an oil-reservoir E, fastened to the bottom of the axle-box by bolts or screws $a$. The bottom $e$ of the reservoir has a slight downward curvature, so that oil contained in the reservoir will gravitate to the lowest point near which the chain D, extending into the reservoir, reaches.

Placed transversely across the reservoir E and depending thereinto for some distance is a guard F of flat tubular shape with parallel side walls $f$ and curved end walls $f'$. The object of the guard F is to prevent the chain D from swinging and from moving laterally as it turns with the axle, a movement which would naturally occur when a car is rounding a curve, as the axles are at such times higher at one end than at the other, in which position of the axles the chains would gravitate toward their lower ends. A part of the guard F projects above the top $e'$ of the reservoir, its upper edge $f^2$ being rounded to prevent the chain from being caught thereon. The lower edge, if desired, may be similarly treated. The top $e'$ of the reservoir trends in a downward direction from each side toward its longitudinal center, which is left open, as at $e^2$, so that oil falling from the axle B on the top $e'$ may return to the reservoir. The filling-opening for the reservoir at $e^3$ is covered by a cap, as shown, while from the bottom $e$ of the reservoir a drain-cock G extends through the bottom of the axle-box for drawing off all dirt and sediment which may collect therein. A sight-glass H is connected to the front of the reservoir to indicate the height of oil.

Having thus described the invention, what is claimed is—

In combination with a car-axle box and an axle projecting therein, a movable oil-reservoir having a curved bottom, supports for said reservoir, and a top inclining downwardly toward its longitudinal center, which latter is open throughout its length, an endless chain passing around said axle and extending into said reservoir to a point near the bottom thereof, and a chain-guard attached to said reservoir transversely thereof, said chain-guard extending into and partly above the top of said reservoir, the upper and lower edges of said chain-guard being curved outwardly.

In testimony whereof I affix my signature in presence of two witnesses.

WILLIAM ALEXANDER.

Witnesses:
J. M. HUNTER,
A. M. HUNTER.